United States Patent
Beyer et al.

(10) Patent No.: US 11,143,297 B2
(45) Date of Patent: Oct. 12, 2021

(54) METHOD OF REDUCING OUTPUT TORQUE DEFICITS DURING LAUNCH OF A CONTINUOUSLY VARIABLE TRANSMISSION

(71) Applicant: Perkins Engines Company Limited, Peterborough (GB)

(72) Inventors: Michael Beyer, Chillicothe, IL (US); Steven Spencer, Germantown Hills, IL (US)

(73) Assignee: Perkins Engines Company Limited, Peterborough (GB)

( * ) Notice: Subject to any disclaimer, the term of this patent is extended or adjusted under 35 U.S.C. 154(b) by 482 days.

(21) Appl. No.: 16/306,059

(22) PCT Filed: Jun. 12, 2017

(86) PCT No.: PCT/EP2017/064300
§ 371 (c)(1),
(2) Date: Nov. 30, 2018

(87) PCT Pub. No.: WO2017/216112
PCT Pub. Date: Dec. 21, 2017

(65) Prior Publication Data
US 2019/0211925 A1    Jul. 11, 2019

(30) Foreign Application Priority Data
Jun. 14, 2016 (EP) .................................. 16174407

(51) Int. Cl.
*F16H 61/462* (2010.01)
*F16H 63/50* (2006.01)
(Continued)

(52) U.S. Cl.
CPC ........... *F16H 61/462* (2013.01); *F16H 47/04* (2013.01); *F16H 63/50* (2013.01);
(Continued)

(58) Field of Classification Search
CPC ........ F16H 61/462; F16H 47/04; F16H 63/50; F16H 2059/363; F16H 2059/702; F16H 2059/704
See application file for complete search history.

(56) References Cited

U.S. PATENT DOCUMENTS

| 4,665,775 A | 5/1987 | Nagamatsu et al. |
| 4,720,793 A | 1/1988 | Watanabe et al. |

(Continued)

FOREIGN PATENT DOCUMENTS

| DE | 195 46 651 A1 | 6/1997 |
| EP | 2955074 A1 | 12/2015 |

(Continued)

OTHER PUBLICATIONS

International Search Report for Application No. PCT/EP2017/064300; dated Aug. 31, 2017.

*Primary Examiner* — Tinh Dang

(57) ABSTRACT

According to the present invention, there is provided a method of reducing output torque deficits during the launch of a vehicle having a continuously variable transmission, wherein the variator has an input connected to a prime mover and an output. The method comprises the steps of determining a rate of change of ratio in the transmission, and predicting a required motor speed ratio rate of change value of the variator on the basis of: (i) the determined rate of change of ratio in the transmission, and (ii) the configuration of the transmission. The speed of the variator output is adjusted so as to achieve the required motor speed ratio rate of change value.

6 Claims, 3 Drawing Sheets

(51) Int. Cl.
*F16H 59/70* (2006.01)
*F16H 59/36* (2006.01)
*F16H 47/04* (2006.01)

(52) U.S. Cl.
CPC .. *F16H 2059/363* (2013.01); *F16H 2059/702* (2013.01); *F16H 2059/704* (2013.01)

(56) References Cited

U.S. PATENT DOCUMENTS

| | | | |
|---|---|---|---|
| 4,947,953 A | | 8/1990 | Morimoto |
| 5,166,877 A | * | 11/1992 | Ishikawa ............... F16H 61/425 477/68 |
| 5,468,196 A | | 11/1995 | Minowa et al. |
| 5,514,050 A | | 5/1996 | Bauerle |
| 5,545,106 A | | 8/1996 | Senger et al. |
| 5,558,596 A | | 9/1996 | Adachi |
| 5,931,884 A | | 8/1999 | Ochiai |
| 6,157,885 A | | 12/2000 | Sakaguchi et al. |
| 6,364,808 B1 | | 4/2002 | Saur |
| 6,901,324 B2 | * | 5/2005 | Rose ................... B60W 10/103 701/54 |
| 9,545,929 B1 | * | 1/2017 | Zhang ............... F16H 61/66254 |
| 2005/0071066 A1 | * | 3/2005 | Rose ................. B60W 30/1882 701/54 |
| 2005/0090367 A1 | | 4/2005 | Jonsson et al. |
| 2008/0194380 A1 | | 8/2008 | Unno |
| 2010/0248875 A1 | | 9/2010 | Jozaki |
| 2011/0015033 A1 | | 1/2011 | Nonomura et al. |
| 2011/0077829 A1 | | 3/2011 | Morselli et al. |
| 2012/0059558 A1 | | 3/2012 | Tanaka et al. |
| 2012/0065854 A1 | * | 3/2012 | Stoller ................... F16H 61/10 701/60 |
| 2013/0073157 A1 | | 3/2013 | Person et al. |
| 2013/0123065 A1 | | 5/2013 | Bujold |
| 2018/0180180 A1 | * | 6/2018 | Moritomo ............ F16H 37/022 |

FOREIGN PATENT DOCUMENTS

| | | |
|---|---|---|
| JP | 4924261 | 6/1974 |
| JP | 60175864 | 9/1985 |
| JP | 6353344 | 3/1988 |
| JP | 2005170280 | 6/2005 |

* cited by examiner

METHOD OF REDUCING OUTPUT TORQUE DEFICITS DURING LAUNCH OF A CONTINUOUSLY VARIABLE TRANSMISSION

FIELD OF THE INVENTION

The present invention is directed to the field of vehicles, and more specifically vehicles which employ a continuously variable transmission (CVT) having a variator. The invention provides a method of reducing output torque deficits, or "torque holes", during the launch phase of the CVT.

BACKGROUND OF THE INVENTION

A CVT will often have multiple ranges therein. During operation in the lower ranges of the CVT a variator can accelerate through the ranges relatively quickly. The more ranges a CVT has, the greater the rate of acceleration of the variator through those ranges. This can lead to the creation of "torque holes" or torque deficits in the transmission due to the high rate of change of the variator when going through the lower ranges. For example, during the launch of a CVT which employs a hydrostatic variator and a launch clutch the variator pump displacement is held stationary whilst the launch clutch brings the transmission output speed up to the speed of the planetary input. When the speeds are within a predetermined range of one another the clutch will lock and the variator pump must transition from the stationary displacement to a high stroke rate in a very short space of time. It is this transition period which can lead to the creation of such torque holes.

It is an aim of the present invention to obviate or mitigate this problem of torque holes during this CVT launch phase.

SUMMARY OF THE INVENTION

According to the present invention, there is provided a method of reducing output torque deficits during the launch of a vehicle having a continuously variable transmission, wherein the variator has an input connected to a prime mover and an output. The method comprises the steps of determining a rate of change of ratio in the transmission, and predicting a required motor speed ratio rate of change value of the variator on the basis of: (i) the determined rate of change of ratio in the transmission, and (ii) the configuration of the transmission. The speed of the variator output is adjusted so as to achieve the required motor speed ratio rate of change value.

BRIEF DESCRIPTION OF THE DRAWINGS

A preferred embodiment of the invention will now be described, by way of example only, with reference to the following drawings.

DETAILED DESCRIPTION OF THE DRAWINGS

Figure 1:
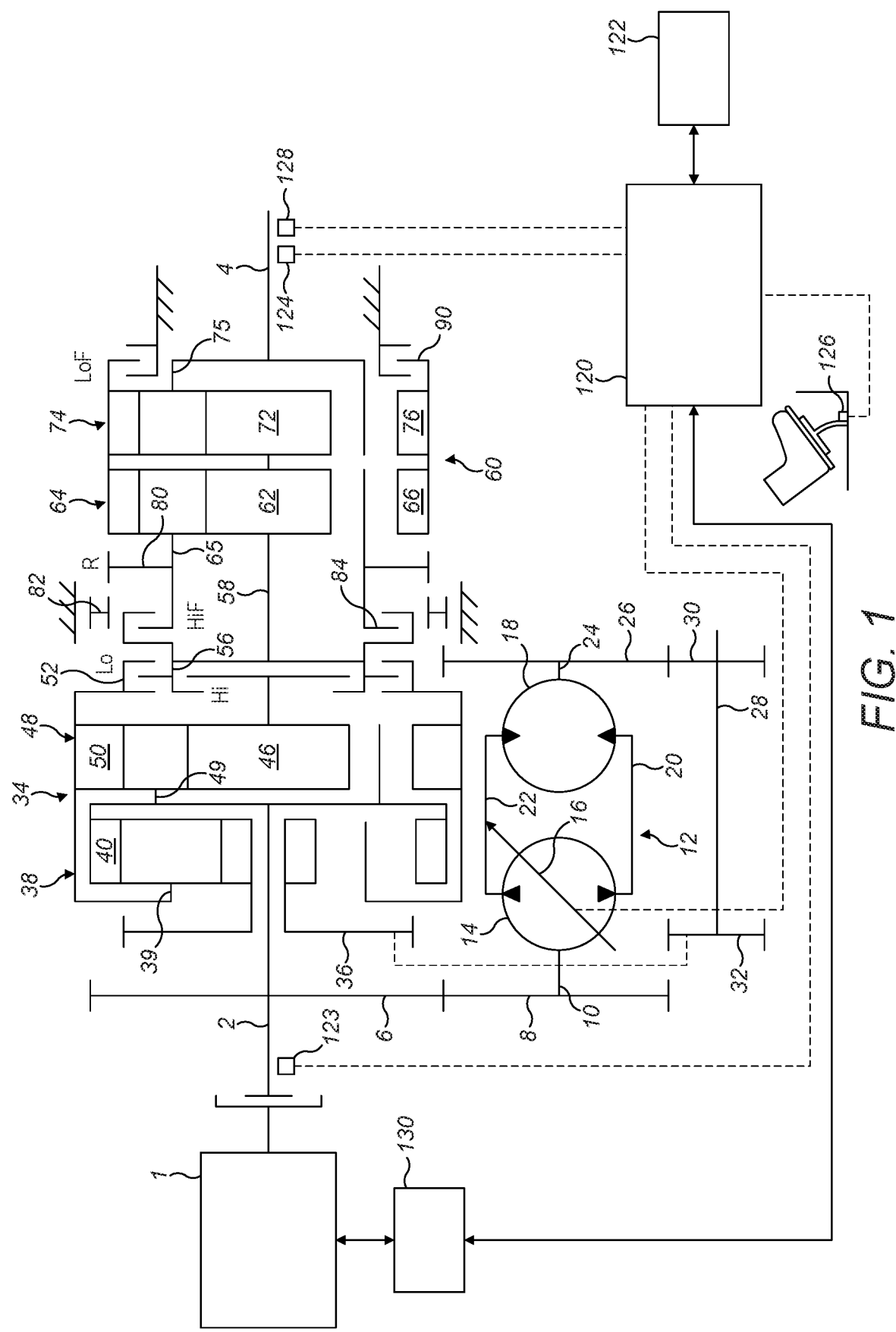
FIG. 1 is a schematic view of an example of a continuously variable transmission.

FIG. 1 schematically illustrates an example of a continuously variable transmission (CVT) which may be controlled using the methods of the present invention. However, it should be understood that the methods of the present invention are not intended for application solely with the specific CVT arrangement shown here. For example, although the variator described below is a hydro-mechanical variator other types of variator may be used. Appropriate alternative variators would be electrical and mechanical variators, for example.

The transmission comprises a transmission input shaft 2 which is connected to a prime mover 1 (e.g. internal combustion engine, electric motor) of a vehicle, and a transmission output shaft 4 which will be connected to a load (not shown) such as the wheels of the vehicle. The input shaft 2 carries an input gear 6 which is meshed with a first satellite gear 8 which is carried on a variator input shaft 10 which lies in parallel to the input shaft 2. The input shaft 10 drives a hydro-mechanical variator, generally designated 12. The variator 12 comprises a variable-volume pump 14 which is driven by the input shaft 10. The pump 14 has a control element or swash plate 16 of a known type, and is fluidly connected to a hydraulic motor 18 by a pair of hydraulic lines 20,22. The motor 18 is connected to a variator output shaft 24 which carries a variator output gear 26. A layshaft 28 lies parallel to the variator shafts 10,24 and has a first layshaft gear 30 which meshes with the output gear 26, and a second layshaft gear 32 which meshes with a first sun gear 36 of a summing transmission 34.

The summing, or differential, transmission, 34 comprises first and second planetary gear sets 38,48. A first ring gear 40 of the first planetary 38 and a second planet carrier 49 of the second planetary 48 are connected to the input shaft 2 such that rotation of the input shaft 2 rotates these two elements as well. A first planet carrier 39 of the first planetary 38 and a second ring gear 50 of the second planetary 48 are connected to an input side of a first low speed clutch 52. A second sun gear 46 of the second planetary 48 is connected to an input side of a first high speed clutch 56. An intermediate shaft 58 is connected to an output side of a first low speed clutch 52 and the first high speed clutch 56. The intermediate shaft 58 is co-axial with the input and output shafts 2,4.

The first low and high speed clutches 52,56 selectively connect the summing transmission 34 with an output, or range, transmission 60 such that the transmissions 34,60 are co-axial with one another. Both the clutches 52,56 are located in a connecting space defined between the summing and output transmissions 34,60. As stated above, the input side of each of the low and high speed clutches 52,56 is connected to at least one element of the summing transmission 34. An output side of each of the first low and high speed clutches 52,56 is connected to the intermediate shaft 58, which is co-axial with the transmission input and output shafts 2,4. The output transmission 60 comprises third and fourth planetary gear sets 64,74 whose respective third and fourth sun gears 62,72 are both connected to the intermediate shaft 58. A third planet carrier 65 of the third planetary 64 is connected to a reverse member 80, which in order to provide a reverse rotation at the output shaft 4 may be selectively held against rotation by a sliding collar 82.

As well as being selectively connected to the intermediate shaft 58, the first low and high speed clutches 52,56 are also selectively connected to the input side of a second high speed clutch 84. The second high speed clutch 84 is located in the connecting space with the first low and high speed clutches 52,56 and has an output side connected to the third planet carrier 65. Thus, when the second high speed clutch 84 is engaged the third sun and planet gears of the third planetary 64 are locked together and will rotate as one.

Third and fourth ring gears 66,76 of the third and fourth planetaries 64,74 are connected to one another and a second low speed clutch, or braking element, 90. When the second low speed clutch 90 is engaged the third and fourth ring gears 66,76 are prevented from rotating. A fourth planet carrier 75 of the fourth planetary 74 is connected to the output shaft 4.

Also shown in FIG. 1 are control components which may be employed to carry out the methods of the present invention. The method steps are carried out by a first electronic control unit (ECU) or transmission controller 120 which is in two-way communication with a RAM memory 122. The memory 122 stores data which is processed in the method, as will be explained in more detail below. The controller 120 is in communication with the variator 12 so that it may control the swash plate 16 and hence the displacement of the variator pump 14 and consequent output of the variator motor 18. At least one rotational input speed sensor 123 and at least one rotational output speed sensor 124 are located adjacent the transmission input 2 and transmission output 4, respectively, so as to provide the controller 120 with signals regarding the input and output speeds of the transmission. At least one operator demand sensor 126 is located in the operator environment of the vehicle, and sends signals to the controller 120 when the operator makes a demand. The demand sensor 126 may be located in order to measure movement of an accelerator pedal (as shown) or a hand control, for example. The illustrated system also includes at least one load sensor 128 which sends signals to the transmission controller 120 as regards the load being placed on the transmission output 4. The load sensor(s) 128 may be monitoring factors such as braking force and/or gradient encountered, for example. Finally, the prime mover 1 has a second ECU or prime mover controller 130 which controls various aspects of the performance of the prime mover, and the prime mover controller 130 and transmission controller 120 are in two-way communication with one another.

INDUSTRIAL APPLICABILITY

Figure 2:
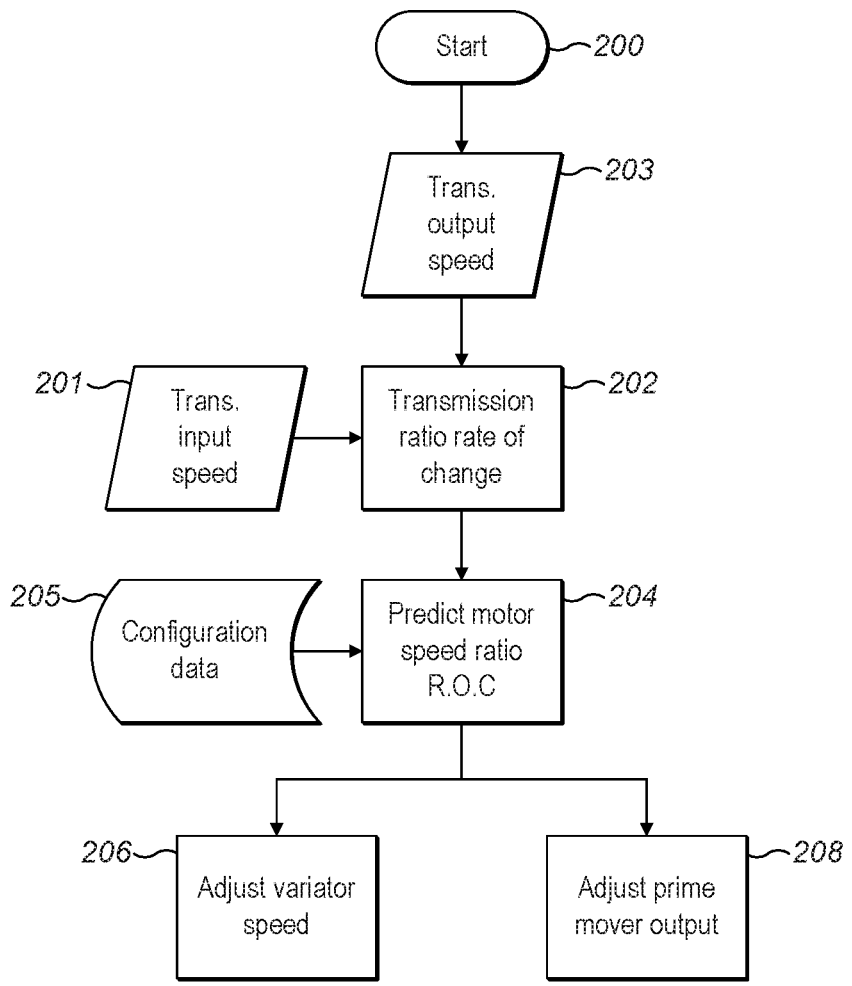
FIG. 2 is a flowchart showing the steps of a first embodiment of a method of reducing output torque deficits in the transmission shown in FIG. 1.

FIG. 2 shows a flowchart detailing the steps taken by the transmission controller 120 when employing a first embodiment of a method for predicting variator ratio rate of change during launch of a CVT such as that shown in FIG. 1. Firstly, following commencement step 200 data relating to a transmission input speed 201 and a transmission output speed 203 is received by the controller 120 from the input and output speed sensors 123,124. These input and output speeds 201,203 then allow the controller 120 to determine the transmission ratio rate of change at process step 202. The transmission ratio rate of change and data 205 stored in the system memory 122 relating to the configuration of the CVT are then applied by the controller 120 in a transform process step 204 in order to predict a motor speed ratio, or pump displacement, rate of change for the variator 12. The transform process step 204 may involve dividing the variator ratio range by the first gear transmission ratio range to calculate the factor between the two ratio ranges. Alternatively, the transform process step 204 may involve using the input and output speed values (applying planetary speed equations) to calculate the variator motor, or input, speed. The rate of change of variator input/motor speed ratio (arrived at by dividing the variator input/motor speed by the variator output/pump speed) is calculated by taking the derivative.

Following this prediction at process step 204, the method then applies a control signal in order to achieve the predicted motor speed ratio rate of change so as to avoid a torque "hole" or output torque deficit due to the rapid displacement changes in the variator pump 14 in this launch phase. This can be done either by process step 206 having the transmission controller 120 send a control signal to the variator 12 so as to adjust the displacement of the pump 14 (and hence the speed of the motor 18), and/or by process step 208 calculating a torque compensation value based on the predicted motor speed ratio rate of change and sending a torque compensation command to the prime mover controller 130. Upon receipt of the torque compensation command the prime mover controller 130 will vary the output speed of the prime mover (and hence the speed of the variator pump 14) accordingly.

Figure 3:
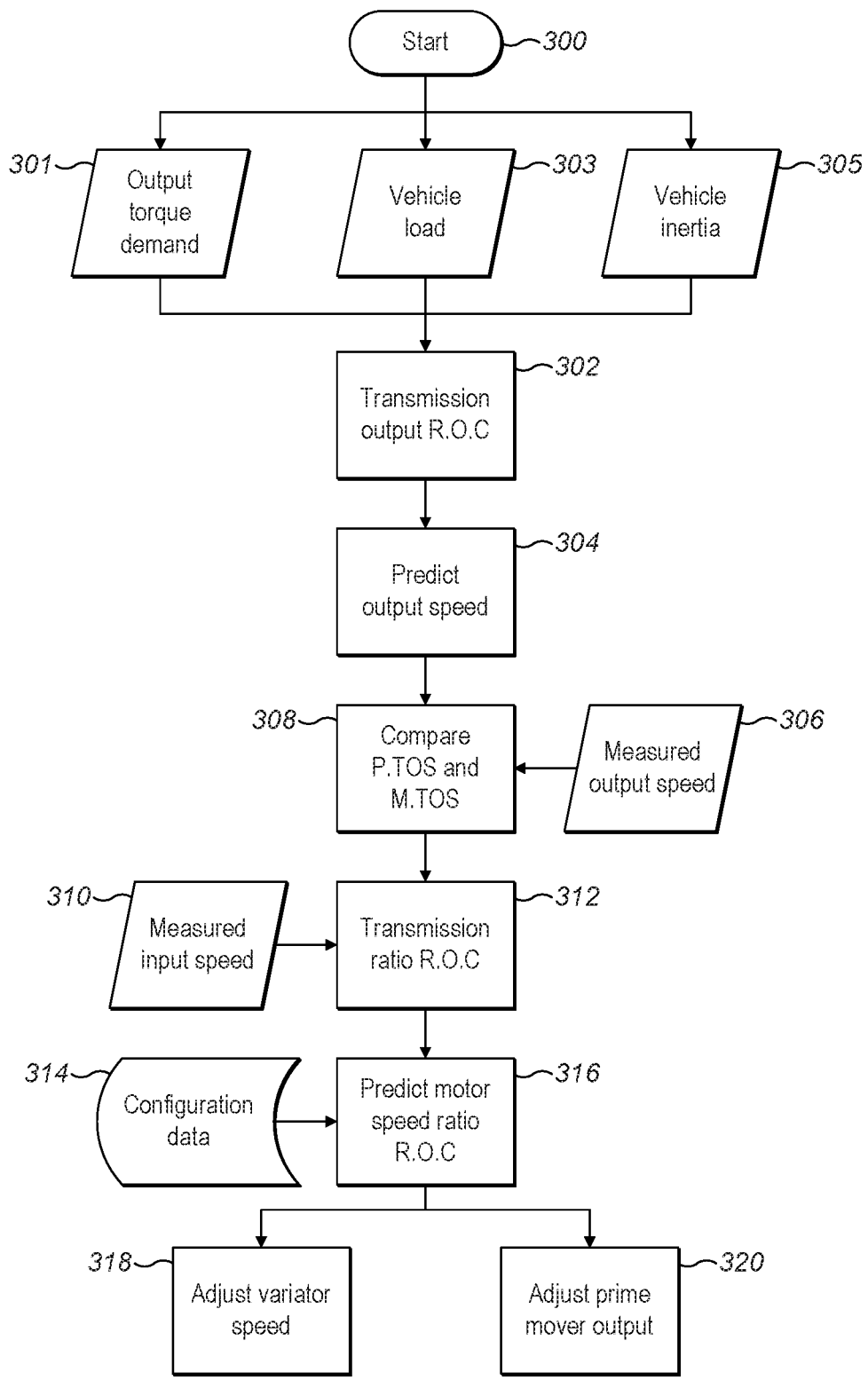
FIG. 3 is a flowchart showing the steps of a second embodiment of a method of reducing output torque deficits in the transmission shown in FIG. 1.

FIG. 3 shows a flowchart detailing the steps taken by the transmission controller 120 when employing an alternative embodiment of a method for predicting variator displacement during launch of a CVT such as that shown in FIG. 1. The main difference between this alternative embodiment and that shown in FIG. 2 is that the transmission ratio rate of change is determined based upon a predicted transmission output speed rather than one which is actually measured. Predicting the transmission output speed is based on the operator's commands (e.g. torque demand), and this alternative method can therefore easily change the predicted output speed as the operator changes commands during launch. It also creates signals which are more stable and less driven by feedback.

Following commencement step 300 the method receives one or more of the following inputs: a transmission output torque demand 301 received from a vehicle operator by way of demand sensor 126; a vehicle load indicator 303 received from the at least one load sensor 128; and vehicle inertia 305 reflected to the transmission output 4. The vehicle load indicator 303 may comprise the vehicle empty mass and payload values. The vehicle inertia 305 can then be calculated by reflecting the vehicle load back to the transmission output shaft (i.e. accounting for the ratio changes through the vehicle axle and any output transfer gear set). Grade and braking force values are also reflected back to the transmission output shaft as a load torque.

At process step 302 one or more of these inputs 301,303, 305 are used in order to predict a transmission output speed rate of change. This may be achieved by dividing the sum of torques (i.e. applied torque less load torque) by the vehicle inertia value. A predicted transmission output speed is then established on the basis of the predicted transmission output speed rate of change at process step 304. Next, the actual transmission output speed is measured via output speed sensor 124 and that data 306 is used in the process in ratification step 308, where the predicted output speed from calculation step 304 is compared with the measured output speed data 306. If the two output speed values are not within a predetermined error value of one another the process will default to using the measured output speed data 306 for the remaining process steps.

Transmission input speed data 310 obtained from input speed sensor 123 is then used along with the predicted or measured output speed data at process step 312 in order to establish a transmission ratio rate of change. The transmission ratio rate of change and data 314 stored in the system memory 122 relating to the configuration of the CVT are then applied by the controller 120 in a transform process step 316 in order to predict a motor speed ratio, or displacement, rate of change for the variator 12. Following this prediction at process step 316, the method then applies a control signal in order to achieve the predicted motor speed ratio rate of change. As with the first embodiment of the method this can be done either by process step 318 having the transmission controller 120 send a control signal to the variator pump 14 so as to adjust the speed of the variator motor 18, and/or by process step 320 calculating a torque compensation value based on the predicted motor speed ratio rate of change and sending a torque compensation command to the prime mover controller 130. Upon receipt of the torque compensation command the prime mover controller 130 will vary the output speed of the prime mover (and hence that of the variator pump 14) accordingly.

The method of the present invention allows the transmission controller to predict the required rate of change of the motor speed ratio, or the pump displacement, of the variator in view of the determined rate of change of the transmission ratio within the CVT during the launch phase. The controller can then use the predicted rate of change of the motor speed ratio to compensate the variator control—either directly or via control of the prime mover—and thereby avoid or at very least reduce any "torque holes" or output torque deficits created due to the high rate of change of pump displacement.

Modifications and improvements may be incorporated without departing from the scope of the present invention.

The invention claimed is:

1. A method of reducing output torque deficits during the launch of a vehicle having a continuously variable transmission, wherein the variator has an input connected to a prime mover and an output, the method comprising the steps of:
   determining a rate of change of ratio in the transmission;
   predicting a required motor speed ratio rate of change value of the variator on the basis of:
   (i) the determined rate of change of ratio in the transmission, and
   (ii) the configuration of the transmission; and
   adjusting the speed of the variator output so as to achieve the required motor speed ratio rate of change value.

2. The method of claim 1, wherein the variator comprises a pump and a motor and the motor is the variator output, and wherein the variator motor speed is adjusted by varying the displacement of the variator pump.

3. The method of claim 1, wherein the variator comprises a pump and a motor and the motor is the variator output, and wherein the variator motor speed is adjusted by calculating a torque compensation value based on the predicted motor speed ratio rate of change value, applying a torque compensation command based on the torque compensation value to a torque control process in control of the prime mover, and varying the output speed of the prime mover in response to the torque compensation command.

4. The method of claim 1, wherein the step of determining the rate of change of ratio in the transmission comprises measuring an input speed and an output speed of the transmission.

5. The method of claim 1, wherein the step of determining the rate of change of ratio in the transmission comprises predicting an output speed rate of change of the transmission based upon one or more of the following variables: a transmission output torque demand received from an operator of the vehicle; a vehicle load applied to the transmission output; and vehicle inertia reflected to the transmission output.

6. The method of claim 1, wherein the step of determining the rate of change of ratio in the transmission comprises:
   measuring an input speed of the transmission;
   measuring an output speed of the transmission;
   calculating a transmission ratio rate of change based upon the measured transmission input and output speeds;
   predicting an output speed rate of change of the transmission based upon one or more of the following variables: a transmission output torque demand received from an operator of the vehicle; a vehicle load applied to the transmission output; and vehicle inertia reflected to the transmission output; and
   determining whether the calculated transmission ratio rate of change and the predicted transmission output speed rate of change are within a predetermined error factor of one another.

* * * * *